(12) United States Patent
Kim

(10) Patent No.: US 9,547,992 B2
(45) Date of Patent: Jan. 17, 2017

(54) APPARATUS AND METHOD FOR PLAYING VIDEO BASED ON REAL-TIME DATA

(71) Applicant: KOREA AEROSPACE RESEARCH INSTITUTE, Daejeon (KR)

(72) Inventor: Joong Wook Kim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 116 days.

(21) Appl. No.: 14/532,222

(22) Filed: Nov. 4, 2014

(65) Prior Publication Data

US 2016/0163207 A1 Jun. 9, 2016

(30) Foreign Application Priority Data

Nov. 5, 2013 (KR) ......................... 10-2013-0133563

(51) Int. Cl.
*A61B 6/00* (2006.01)
*G05B 11/01* (2006.01)
*G08G 5/04* (2006.01)
*G08G 5/00* (2006.01)

(52) U.S. Cl.
CPC ............. *G08G 5/04* (2013.01); *G08G 5/0026* (2013.01)

(58) Field of Classification Search
USPC ......................... 701/301; 600/425; 340/12.52
See application file for complete search history.

(56) References Cited

U.S. PATENT DOCUMENTS

| | | | | |
|---|---|---|---|---|
| 5,487,172 A * | 1/1996 | Hyatt | .................. | B60R 16/0373 700/8 |
| 8,755,965 B1 * | 6/2014 | McClintic | ............ | G05D 1/0016 701/23 |
| 2004/0068415 A1 * | 4/2004 | Solomon | .............. | G05D 1/0088 89/1.11 |
| 2007/0005199 A1 * | 1/2007 | He | ......................... | G01C 23/00 701/16 |
| 2007/0100515 A1 * | 5/2007 | McClure | ................ | G09B 29/00 701/3 |
| 2009/0128034 A1 * | 5/2009 | Ku | .......................... | H01J 11/10 313/584 |
| 2009/0220929 A1 * | 9/2009 | Daniel | ................... | G09B 19/16 434/362 |
| 2010/0240988 A1 * | 9/2010 | Varga | ................... | G02B 27/017 600/425 |
| 2013/0293362 A1 * | 11/2013 | Parazynski | ............ | G08C 19/16 340/12.52 |

FOREIGN PATENT DOCUMENTS

| | | |
|---|---|---|
| JP | 11-044551 A | 2/1999 |
| JP | 2002-260200 A | 9/2002 |
| KR | 1020090082008 A | 7/2009 |

OTHER PUBLICATIONS

Korean Office Action dated Jan, 19, 2015; Appln. No. 10-2013-0133563.

* cited by examiner

*Primary Examiner* — Tyler Paige

(74) *Attorney, Agent, or Firm* — Ladas & Parry LLP

(57) ABSTRACT

Provided are an apparatus and method for playing a video based on real-time data. The apparatus includes a ground control unit which receives flight data including position information, speed information, and attitude information of an aircraft from at least one aircraft and a video playing unit which receives the flight data from the ground control unit and displays the flight data on a map screen.

4 Claims, 2 Drawing Sheets

APPARATUS AND METHOD FOR PLAYING VIDEO BASED ON REAL-TIME DATA

CROSS-REFERENCE TO RELATED APPLICATION

This application claims priority to and the benefit of Korean Patent Application No. 2013-0133563, filed on Nov. 5, 2013, the disclosure of which is incorporated herein by reference in its entirety.

BACKGROUND

1. Field of the Invention

The present invention relates to an apparatus and method for playing a video based on real-time data.

2. Discussion of Related Art

Conventional video playing apparatuses are being widely used for post-processing of flight data or in simulation systems.

However, data related to movement of a mounted system or an aircraft is limited to simulation data, and is used during pilot training.

An existing control system includes a system which controls an aircraft and systems which control mission systems. Thus, there is a problem in that an internal pilot can know an attitude and position of the aircraft only as numbered information.

Generally, the internal pilot who operates an unmanned aerial vehicle undergoes a difficulty in identifying a large amount of information that comes down from the aircraft unlike a pilot of a manned aerial vehicle. Because, while the pilot on board the manned aerial vehicle directly and visually checks or detects information of the aircraft using different senses, the internal pilot of the unmanned aerial vehicle operates the aircraft using only indirect information.

SUMMARY OF THE INVENTION

The present invention is directed to an apparatus and method for playing a video based on real-time data using the same can display aircraft information and environment using data of actual flight, and that can more stably operate the aircraft through ground and aerial collision analyses.

According to an aspect of the present invention, there is provided an apparatus for playing a video based on real-time data, including: a ground control unit which receives flight data including position information, speed information, and attitude information of an aircraft from at least one aircraft; and a video playing unit which receives the flight data from the ground control unit and displays the flight data on a map screen.

The video playing unit may include a receiver module which receives the flight data and a processing module which performs a collision analysis using the flight data.

The processing module may classify the flight data into position information, speed information, and attitude information of the aircraft, and information of other aircraft.

The processing module may calculate a flight path of the aircraft using the position information, the speed information, and the attitude information of the aircraft, compare the flight path to previously stored geographic feature data, and perform a collision analysis.

The processing module may calculate a flight path of the aircraft using the position information, the speed information, and the attitude information of the aircraft, compare the flight path to a flight path calculated using the information of other aircraft, and perform a collision analysis.

The apparatus may further include a display module which displays the previously stored geographic feature data, the aircraft information, and a collision analysis result on a 3-dimensional map space.

According to another aspect of the present invention, there is provided a method for playing a video based on real-time data, including: receiving flight data including position information, speed information, and attitude information of an aircraft from at least one aircraft by a ground control unit; receiving the flight data from the ground control unit by a video playing unit; and displaying the flight data on a map screen by the video playing unit.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
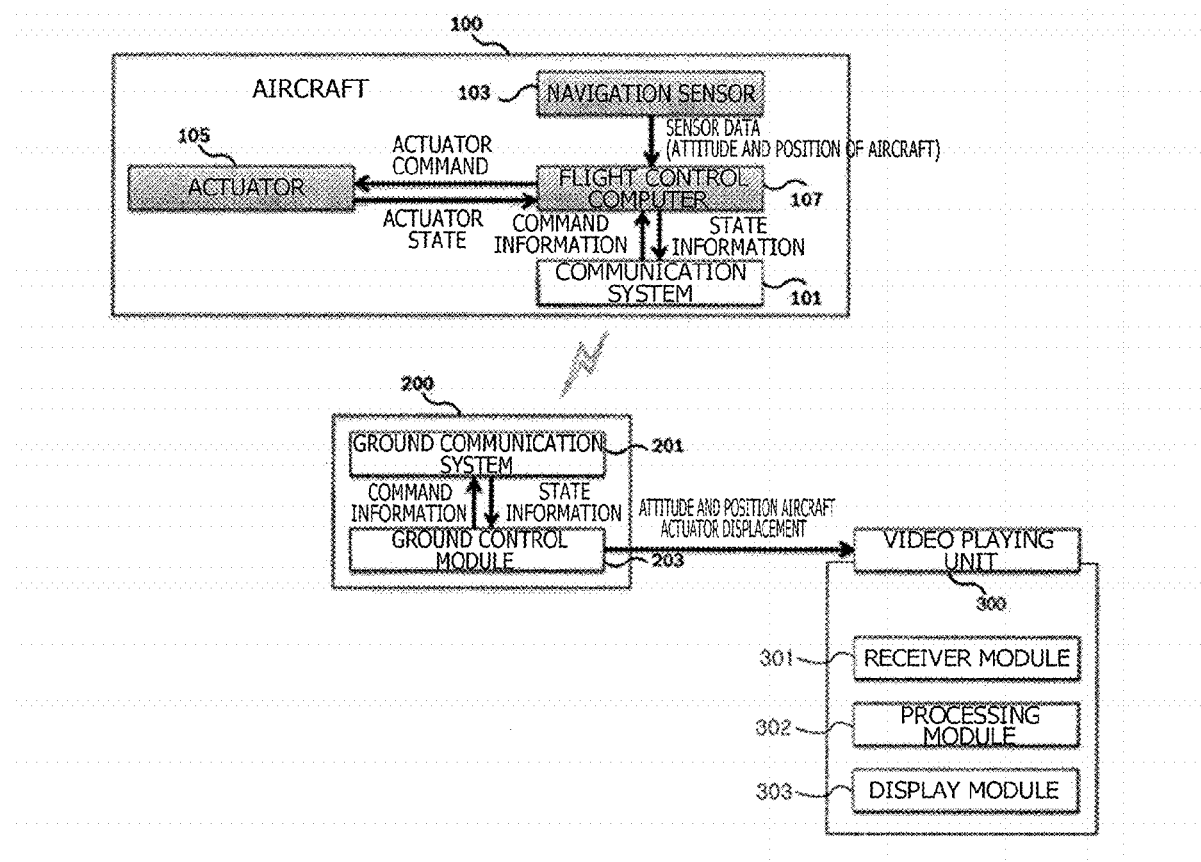
FIG. 1 shows a configuration of an apparatus for playing a video based on real-time data according to an exemplary embodiment of the present invention.

Hereinafter, exemplary embodiments of the present invention that are easily performed by those skilled in the art will be described in detail with reference to the accompanying drawings. However, the present invention can be implemented in many different forms, and is not limited to the herein-described embodiments. In order to clearly describe the present invention, parts which are not related to descriptions will be omitted from the drawings, and parts performing similar functions and operations throughout the drawings are denoted by the same reference numerals.

Throughout this specification, when a certain part "includes" a certain component, it means that another component may be further included and not excluding another component unless otherwise defined.

Moreover, terms described in the specification such as " . . . unit," refer to a unit of processing at least one function or operation, and may be implemented by hardware or software or a combination thereof.

Hereinafter, an apparatus and method for playing a video based on real-time data according to an exemplary embodiment of the present invention will be described in detail with reference to the drawings.

Here, the apparatus for playing a video based on real-time data may be mounted on an unmanned aerial vehicle control system and an aircraft black-box analysis system. Further, the apparatus may be included in a control system of the unmanned aerial vehicle control system or added to a flight information analysis system.

In this case, the apparatus for playing a video based on real-time data according to the embodiment of the present invention uses flight data obtained through a communication system during an actual flight rather than conventional data after a flight, computer data to simulate a mounted system, or data simulated from a motion modeling computer.

FIG. 1 shows a configuration of the apparatus for playing a video based on real-time data according to the exemplary embodiment of the present invention.

Referring to FIG. 1, the apparatus for playing a video based on real-time data may include a ground control unit 200 and a video playing unit 300.

An aircraft 100 controlled by the ground control unit 200 generates and broadcasts real-time flight data. The flight data may include position information, speed information, and attitude information of the aircraft 100.

The aircraft 100 includes a communication system 101, a navigation sensor 103, an actuator 105, and a flight control computer 107.

The communication system 101 receives command information and transmits the flight data by being wirelessly connected to a ground communication system 201 of the ground control unit 200.

The navigation sensor 103 senses the flight data including the position information, the speed information, and the attitude information of the aircraft 100 and then outputs the flight data to the flight control computer 107.

The actuator 105 receives an actuator command according to the command information received from the flight control computer 107, and outputs an actuator state to the flight control computer 107.

The flight control computer 107 transmits sensed data output from the navigation sensor 103 and the flight data including the actuator state received from the actuator 105 to the ground control unit 200. Then, the flight control computer 107 controls the aircraft 100 according to the command information received from the ground control unit 200.

The ground control unit 200 includes the ground communication system 201 and a ground control module 203.

Here, the ground communication system 201 transmits the command information and receives the flight data by being wirelessly connected to the communication system 101 of the aircraft 100.

In this case, the flight data may include the attitude information and the position information of the aircraft 100, and an operational state of the actuator 105.

The ground control module 203 generates command information for the aircraft according to a control of a pilot and then outputs the command information to the ground communication system 201. The ground control module 203 outputs the flight data which the ground communication system 201 receives to the video playing unit 300.

The video playing unit 300 may include a receiver module 301, a processing module 302, and a display module 303.

The video playing unit 300 converts the real-time flight data obtained from the aircraft 100 by the ground control unit 200 into a 3-dimensional video, and then outputs the 3-dimensional video on a map screen. That is, the video playing unit 300 updates and outputs the attitude information, configuration information, and the position information of the aircraft calculated based on the real-time flight data on the map screen. In this case, the video playing unit 300 may receive the flight data including the state of the actuator 105, generate the 3-dimensional video based on the state and displacement information of the actuator 105, and then display the 3-dimensional video on the map screen.

Further, the video playing unit 300 may perform an analysis of collision with a geographic feature, another aircraft, etc.

Figure 2:
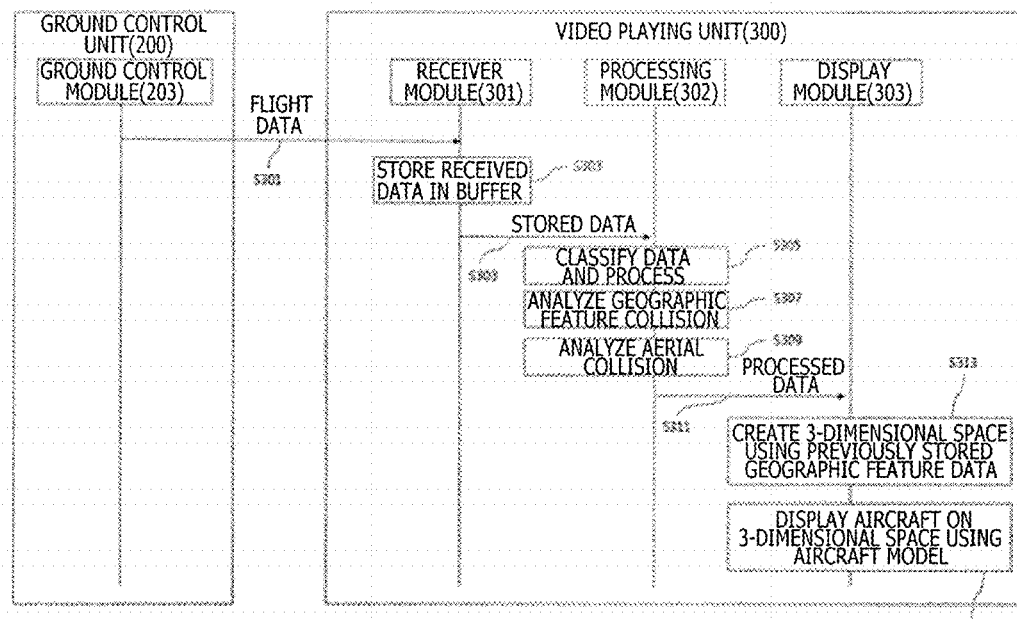
FIG. 2 is a view for describing an operation of a video playing unit according to the exemplary embodiment of the present invention.

An operation of the apparatus for playing a video based on real-time data is the same as that in FIG. 2.

FIG. 2 shows a method of playing the video based on real-time data according to the exemplary embodiment of the present invention.

FIG. 2 is a view for describing an operation of the video playing unit according to the exemplary embodiment of the present invention.

First, referring to FIG. 2, an aircraft 100 creates flight data and then transmits the flight data to a ground control unit 200 through a communication system 201. The ground control module 203 transmits the received flight data to a video playing unit 300 using a broadcasting method (S301).

A receiver module 301 of the video playing unit 300 receives the flight data and then stores the flight data in an internal buffer (S302).

A processing module 302 reads the stored data (S303).

The processing module 302 checks the read data and then classifies the read data into position information, speed information, and attitude information of the aircraft, and information of another aircraft. In this case, the processing module 302 may receive the information of another aircraft from an automatic dependent surveillance-broadcast (ADS-B) system, a traffic collision avoidance system (TCAS), or the like, which receives data from a ground or the aircraft (S305).

The processing module 302 calculates a flight path of the aircraft using the position information, the speed information, and the attitude information of the aircraft, compares the flight path to previously stored geographic feature data based on flight path information, and then analyzes a possibility of collision with the geographic features, a degree of risk, and the like (S307).

Further, the processing module 302 compares the flight path of the aircraft calculated using the position information, the speed information, and the attitude information of the aircraft to a flight path of another aircraft calculated using the position information, the speed information, and the attitude information of another aircraft, and then analyzes a possibility of collision with another aircraft (S309).

The collision analysis with the geographic feature and the collision analysis with another aircraft by the processing module 302 may not be sequentially performed as described above, may be simultaneously performed, or the collision analysis with another aircraft may be performed first.

The processing module 302 transmits collision analysis data to the display module 303 (S311).

The display module 303 creates a 3-dimensional space using the previously stored geographic feature data, a precise satellite map, the aircraft position information of the processed data as needed, and then displays the precise satellite map on the 3-dimensional space (S313).

The display module 303 displays the aircraft on the 3-dimensional map space generated using a previously stored 3-dimensional model of the aircraft based on the position information, the speed information, and the attitude information of the aircraft, and displays information such as a position in which a collision can occur, a possibility of collision, risk based on a collision analysis result (S315).

The embodiments of the present invention described above are not intended to be implemented only through the method and apparatus, and may be implemented through a program for realizing functions corresponding to the configuration of the embodiments of the present invention, or through a recording medium in which the program is recorded.

According to the exemplary embodiments of the present invention, conventionally, an internal pilot can know an attitude and position of the aircraft only as numbered information, however, the pilot can visually identify the attitude and the position of the aircraft using the apparatus for playing a video based on real-time data, and thus it is helpful for the pilot when operating the aircraft.

Further, when the apparatus for playing a video based on real-time data is used in flight tests, flight information analysts can identify at a glance the attitude and the position of the aircraft, and thus, can determine a reaction of the aircraft with respect to an operational command at a glance and in a very short time.

Further, flight information and geographical information of the aircraft can be used for warnings in advance about collisions with a terrain, ground structures, and the ground. As a possibility of an aerial collision is prevented by analyzing information of surrounding aircraft, stability when operating the aircraft can be maximized.

The present invention has been described in detail with reference to the exemplary embodiments. However, the exemplary embodiments should be considered in a descriptive sense only and the present invention is not limited thereto. It will be apparent to those skilled in the art that various modifications and improvements may be made within the scope of the present invention.

What is claimed is:

1. An apparatus for playing a video based on real-time data, comprising:
   a ground control unit configured to receive flight data including position information, speed information, and attitude information of an aircraft from at least one aircraft; and
   a video playing unit comprising a receiver module configured to receive the flight data; and a processing module configured to perform a collision analysis using the flight data and a display module configured to display the flight data on a map screen,
   wherein the processing module calculates a flight path of the aircraft using the position information, the speed information, and the attitude information of the aircrafts,
   and compares the flight path to previously stored geographic feature data based on flight path information, and then analyzes a possibility of collision with the geographic features,
   and compares the flight path of the aircraft to a flight path of another aircraft calculated using the position information, the speed information, and the attitude information of another aircraft, and then analyzes a possibility of collision with another aircraft;
   and the display module displays the aircraft on a 3-dimensional map space generated using a previously stored 3-dimensional model of the aircraft based on the position information, the speed information, and the attitude information of the aircraft, and displays information such as a position in which a collision can occur, a possibility of collision based on a collision analysis result.

2. The apparatus of claim 1, wherein the processing module classifies the flight data into position information, speed information, and attitude information of the aircraft, and information of other aircraft.

3. A method for playing a video based on real-time data, comprising:
   receiving flight data including position information, speed information, and attitude information of an aircraft from at least one aircraft by a ground control unit;
   receiving the flight data from the ground control unit by a receiver module; and
   calculating a flight path of the aircraft using the position information, the speed information and the attitude information of the aircrafts by a processing module;
   comparing the flight path to previously stored geographic feature data based on flight path information, and then analyzes a possibility of collision with the geographic features by the processing module;
   comparing the flight path of the aircraft to a flight path of another aircraft calculated using position information, speed information, and attitude information of another aircraft, and then analyzes a possibility of collision with another aircraft by the processing module;
   and displaying the aircraft on a 3-dimensional map space generated using a previously stored 3-dimensional model of the aircraft based on the position information, the speed information, and the attitude information of the aircraft, and displays information such as a position in which a collision can occur, a possibility of collision based on a collision analysis result by a display module.

4. The method of claim 3, wherein the performing of the collision analysis comprises:
   classifying the flight data into position information, speed information, the attitude information of the aircraft, and information of other aircraft; and
   calculating a flight path of the aircraft using the position information, the speed information, and the attitude information of the aircraft, comparing the flight path to previously stored geographic feature data, and performing a collision analysis.

* * * * *